3,147,305
2-PHENYLCYCLOPROPYLSULFAMIDES
John J. Lafferty, Levittown, and Bernard Loev, Broomall, Pa., assignors to Smith Kline & French Laboratories, Philadelphia, Pa., a corporation of Pennsylvania
No Drawing. Filed Dec. 6, 1962, Ser. No. 242,651
5 Claims. (Cl. 260—556)

This invention relates to novel 2-phenylcyclopropylsulfamides which have pharmacodynamic activity in particular central nervous system activity. More specifically the compounds of this invention have anti-anxiety, tranquilizing and sedative activity.

The novel 2-phenylcyclopropylsulfamides of this invention are represented by the following structural formula:

FORMULA I

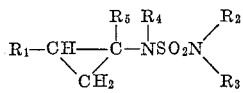

when:

$R_1$ represents phenyl, halophenyl, trifluoromethylphenyl, lower alkylphenyl, lower alkoxyphenyl, aminophenyl, hydroxyphenyl, dihalophenyl, di-lower alkylphenyl, di-lower alkoxyphenyl or methylenedioxyphenyl;

$R_2$ and $R_3$ represent hydrogen or, when taken together, mono-lower alkylamino, di-lower alkylamino, N-pyrrolidinyl, N-piperidyl, N-piperazinyl, N'-lower alkyl-N-piperazinyl or N'-hydroxy-lower alkylenepiperazinyl;

$R_4$ represents hydrogen or lower alkyl and $R_5$ represents hydrogen or lower alkyl.

Advantageous compounds of this invention are represented by the following formula:

FORMULA II

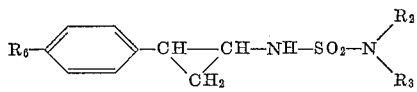

when:

$R_2$ and $R_3$ represent hydrogen or methyl and $R_6$ represents hydrogen, chloro or trifluoromethyl.

By the terms "lower alkyl" and "lower alkoxy" where used herein groups having from 1 to 4, preferably 1 to 2, carbon atoms are indicated. The term "lower alkylene" denotes groups having 2 to 5, preferably 2, carbon atoms. By the term "halo," halogen moieties having an atomic weight of less than 80, i.e. chloro, bromo and fluoro, are indicated.

The compounds of this invention may be present as cis or trans isomers and also as $d$ or $l$ optical isomers. It is intended to include in this invention all of these isomers, the separated cis and trans isomers and the resolved $d$ and $l$ isomers as well as mixtures of these isomers.

The 2-phenylcyclopropylsulfamides of Formula I in which $R_4$ is hydrogen are prepared by reacting the corresponding phenylcyclopropylamine with a lower alkyl formate, preferably with an excess of the formate, at elevated temperature conveniently at reflux temperature, to give N-formyl-2-phenylcyclopropylamine. This intermediate is converted to its sodio derivative by reacting with an equimolar amount of sodium hydride in an inert solvent such as an aromatic hydrocarbon, for example benzene or toluene. The reaction is preferably carried out at the reflux temperature of the reaction mixture.

The sodio derivative of N-formyl-2-phenylcyclopropylamine is reacted in an inert solvent such as an aromatic hydrocarbon, for example benzene or toluene, with sulfuryl chloride followed by ammonia or the appropriate amine to give the N-formyl-N-(2-phenylcyclopropyl)-sulfamide intermediate which on hydrolysis, for example with dilute hydrochloric acid, gives the 2-phenylcyclopropylsulfamides of Formula I in which $R_4$ is hydrogen.

The compounds of this invention according to Formula I in which $R_4$ is lower alkyl are prepared by reacting N-lower alkyl - 2 - phenylcyclopropylamine with sulfuryl chloride in an inert solvent such as an aromatic hydrocarbon, for example benzene or toluene, followed by ammonia or the appropriate amine to give the N-lower alkyl-N-(2-phenylcyclopropyl)sulfamides.

The cis and trans isomers of the compounds of Formula I are prepared by employing the appropriate cis or trans-2-phenylcyclopropylamine starting material. To prepare the separated $d$ and $l$ isomers of the compounds of this invention the appropriate $d$ or $l$-2-phenylcyclopropylamine starting material is used.

The 2-phenylcyclopropylamine starting materials are either known to the art or are prepared from the appropriately substituted styrene as follows:

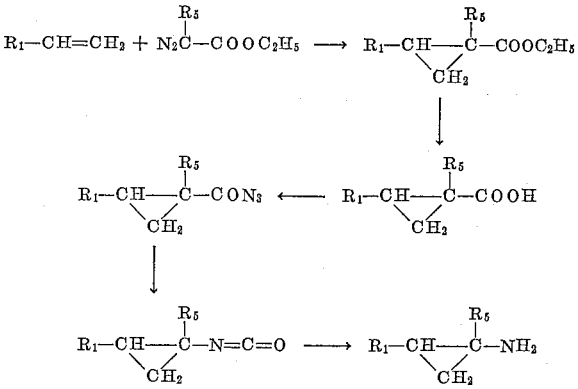

The terms $R_1$ and $R_5$ are as defined hereabove.

The styrene is condensed with an ethyl diazoacetate to give an ethyl 2-phenylcyclopropanecarboxylate which can be fractionally distilled to separate the cis and trans isomeric carboxylates. The carboxylates are saponified by refluxing with an aqueous alcoholic solution of an alkali metal hydroxide such as potassium or sodium hydroxide to give the corresponding carboxylic acids. Alternatively, the isomeric mixture of carboxylates can be saponified as above to give a mixture of carboxylic acids which can be then separated into the cis and trans isomers by fractional crystallization.

An advantageous method for the stereospecific conversion of phenylcyclopropane carboxylic acids to the corresponding isocyanates and amines is to react the carboxylic acid with a lower alkyl haloformate to give the corresponding cyclopropyl mixed anhydride. The reaction is preferably carried out in the presence of an organic base preferably a tertiary amine such as triethylamine at about 0–20° C. in a mixture of water and a water miscible organic solvent such as dioxane or acetone. The mixed anhydride thus formed is treated with sodium azide to give the cyclopropylcarboxylic acid azide. The azide is heated in an inert organic solvent such as toluene or xylene to give, upon removal of the solvent, the corresponding isocyanate. The isocyanate is then hydrolyzed to give the phenylcyclopropylamine.

Alternatively, the cyclopropylcarboxylic acid is converted to the corresponding azide by treating with a chlorinating agent such as thionyl chloride or phosphorus pentachloride and treating the acid chloride with sodium azide. The azide is then converted, through the isocyanate, to the amine starting materials as described above.

By an alternate method, the cyclopropylcarboxylic acid is esterified with diazomethane in ether, the resulting methyl ester is reacted with hydrazine hydrate in a lower alkanol such as ethanol and the resulting hydrazide is diazotized by treating with hydrochloric acid and sodium nitrite to give the azide which is converted to the isocyanate and then to the 2-phenylcyclopropylamine as described above.

In addition, the 1-lower alkyl-2-phenylcyclopropylamine starting materials for the compounds of Formula I in which $R_5$ is lower alkyl may be prepared by reacting a phenyldiazomethane with an α-lower alkylacrylic acid ester such as the methyl or ethyl ester. The reaction is carried out in an inert organic solvent such as ether at about −5° C. to 10° C. Advantageously a small amount of hydroquinone is present as a stabilizer. The product is a 1-lower alkyl-2-phenylcyclopropylcarboxylic acid ester which is converted as described above to the acid, the azide, the isocyanate and then to the amine starting material.

Separated d and l phenylcyclopropylamine starting materials are prepared by converting the dl mixture to a salt such as a tartrate salt, fractionally crystallizing the salt and neutralizing to obtain the separated d and l isomers of the amine starting material.

The following examples are not limiting but are illustrative of compounds of this invention and the procedures for their preparation.

*Example 1*

Twenty grams of trans-2-phenylcyclopropylamine is heated at reflux in ethyl formate for ten hours. Upon evaporation and recrystallization of the residue from ether there is obtained trans-N-formyl-2-phenylcyclopropylamine.

A mixture of 8.0 g. of trans-N-formyl-2-phenylcyclopropylamine and 1.2 g. of sodium hydride in 100 ml. of benzene is refluxed for one hour to give the sodio derivative of trans-N-formyl-2-phenylcyclopropylamine. A solution of 6.7 g. of sulfuryl chloride in 20 ml. of benzene is added with stirring at 0–5° C. This mixture is treated with gaseous ammonia until a large excess is present and then allowed to stand overnight. The mixture is filtered and the filtrate is washed with water and evaporated to dryness in vacuo to give N-formyl-2-phenylcyclopropylsulfamide. This N-formyl compound is heated with 3% aqueous hydrochloric acid for one hour and extracted with benzene. The benzene extracts are washed with water and concentrated. The residue is recrystallized from benzene to give trans-2-phenylcyclopropylsulfamide, M.P. 109–110° C.

*Example 2*

By the procedure of Example 1, cis-2-phenylcyclopropylamine is refluxed with ethyl formate to give cis-N-formyl-2-phenylcyclopropylamine. Four grams of this N-formyl compound and 0.6 g. of sodium hydride in 50 ml. benzene are refluxed for one hour. A solution of 3.4 g. of sulfuryl chloride and 15 ml. of benzene is added at 0° C. with stirring. The mixture is treated with an excess of gaseous ammonia and allowed to stand overnight. Working up as in Example 1, heating with dilute aqueous hydrochloric acid and isolating the product gives cis-2-phenylcyclopropylsulfamide.

*Example 3*

A mixture of 11.5 g. of trans-N-formyl-2-(4-trifluoromethylphenyl)cyclopropylamine [prepared by refluxing trans-2-(4-trifluoromethylphenyl)cyclopropylamine in ethyl formate] and 1.2 g. of sodium hydride in 100 ml. of benzene is refluxed for one hour, cooled and treated with a solution of 6.7 g. of sulfuryl chloride in benzene at 0° C. The mixture is treated with an excess of gaseous ammonia. Removing the solvent, treating the residue with dilute aqueous hydrochloric acid and working up as in Example 1 gives trans-2-(4-trifluoromethylphenyl)cyclopropylsulfamide.

*Example 4*

By the procedure of Example 1, trans-2-(4-chlorophenyl)cyclopropylamine is converted to the corresponding N-formyl derivative (9.8 g.) which is then refluxed in benzene with 1.2 g. of sodium hydride for one hour. The resulting sodio derivative is treated with 6.7 g. of sulfuryl chloride in benzene at 0° C. An excess of gaseous ammonia is added and the mixture is allowed to stand overnight. Working up as in Example 1 and heating with dilute aqueous hydrochloric acid gives trans-2-(4-chlorophenyl)cyclopropylsulfamide.

Cis-ethyl-2-(4-chlorophenyl)cyclopropane carboxylate is refluxed for five hours with potassium hydroxide in aqueous ethanol, the resulting cis carboxylic acid is treated with diazomethane in ether, the resulting methyl ester is refluxed for five hours with hydrazine hydrate in ethanol and the hydrazide is diazotized by treating with hydrochloric acid and sodium nitrite at 0° C. to give the cis azide. Rearrangement of the azide by refluxing in methanol for five hours gives the methyl urethan which is hydrolyzed by refluxing with a saturated methanolic solution of barium hydroxide octahydrate for 36 hours. Filtering and concentrating to dryness gives, as the residue, cis-2-(4-chlorophenyl)cyclopropylamine.

Using cis-2-(4-chlorophenyl)cyclopropylamine in place of the trans isomer in the procedure described above gives cis-2-(4-chlorophenyl)cyclopropylsulfamide.

*Example 5*

A mixture of 8.0 g. of N-formyl-2-phenylcyclopropylamine (prepared by refluxing 2-phenylcyclopropylamine in ethyl formate) and 1.2 g. of sodium hydride in benzene is refluxed for one hour. To this mixture is added 6.7 g. of sulfuryl chloride in benzene at 0–5° C. The resulting mixture is treated with excess methylamine. After allowing to stand for ten hours the mixture is filtered, the filtrate is evaporated and the residue is heated with dilute aqueous hydrochloric acid for one hour. After extracting with benzene, washing the extract with water and concentrating, the residue is recrystallized from benzene to give N'-methyl-N-(2-phenylcyclopropyl)sulfamide.

By the procedure described above using dimethyl amine in place of methylamine the product is N',N'-dimethyl-N-(2-phenylcyclopropyl)sulfamide.

*Example 6*

The sodio derivative of N-formyl-2-phenylcyclopropylamine prepared as in Example 5 is treated with a benzene solution of sulfuryl chloride at 0–5° C. The mixture is treated with an excess of piperidine at room temperature. After allowing to stand overnight the mixture is filtered. The filtrate is washed with water and evaporated to dryness in vacuo. The residue is heated with dilute aqueous hydrochloric acid for one hour and worked up as in Example 5 to give N-(2-phenylcyclopropyl)-1-piperidinesulfonamide.

Similarly using pyrrolidine in place of piperidine there is obtained N-(2-phenylcyclopropyl)-1-pyrrolidinesulfonamide.

*Example 7*

The sodio derivative of N-formyl-2-phenylcyclopropylamine prepared as in Example 5 is treated with an equimolar amount of sulfuryl chloride at 0–5° C. The mixture is treated with an excess of piperazine and allowed to stand overnight. Working up as in Example 1, heating with dilute aqueous hydrochloric acid and isolating the product as described in Example 1 gives N-(2-phenylcyclopropyl)-1-piperazinesulfonamide.

By the same method using N-methylpiperazine there is obtained N-(2-phenylcyclopropyl)-4-methyl-1-piperazinesulfonamide.

*Example 8*

By the procedure of Example 7 substituting N-acetoxyethylpiperazine for piperazine gives the N-formyl-N-(2- phenylcyclopropyl)-4-acetoxyethyl-1-piperazinesulfonamide intermediate which is heated with dilute hydrochloric acid for two hours to give, after extracting with benzene, washing the extract with water, evaporating the benzene and recrystallizing the residue, N-(2-phenylcyclopropyl)-4-hydroxyethyl-1-piperazinesulfonamide.

*Example 9*

Eleven grams of N-formyl-2-(3,4-dimethoxyphenyl)cyclopropylamine [prepared by refluxing 2-(3,4-dimethoxyphenyl)cyclopropylamine with ethyl formate for 10 hours] and 1.2 g. of sodium hydride in 100 ml. toluene are refluxed for 90 minutes to give the sodio derivative. To this mixture is added 6.7 g. of sulfuryl chloride in 25 ml. of toluene at about 5° C. with stirring. The mixture is treated with gaseous ammonia until an excess is present, then is allowed to stand overnight. Working up as in Example 1, heating the N-formyl intermediate with dilute aqueous hydrochloric acid for one hour and isolating the product gives 2-(3,4-dimethoxyphenyl)cyclopropylsulfamide.

*Example 10*

Ten grams of 2-(3,4-methylenedioxyphenyl)cyclopropylamine is refluxed in 100 ml. of ethyl formate for ten hours to give the N-formyl derivative.

A mixture of 11.8 g. of N-formyl-2-(3,4-methylenedioxyphenyl)cyclopropylamine, 1.2 g. of sodium hydride and 100 ml. of benzene is heated at reflux for one hour. A solution of 6.7 g. of sulfuryl chloride in benzene is added with stirring at 0° C. The mixture is treated with an excess of gaseous ammonia to give, after working up as in Example 1 and heating with dilute hydrochloric acid, 2-(3,4-methylenedioxy)phenylcyclopropylsulfamide.

*Example 11*

2,5-dichlorostyrene (15.0) and 17.5 g. of ethyl diazoacetate are mixed at 0° C. and the mixture gradually heated to 150° C. The reaction is maintained at this temperature for three hours and then the mixture is distilled under reduced pressure to give ethyl 2-(2,5-dichlorophenyl)cyclopropanecarboxylate.

A solution of 6.0 g. of potassium hydroxide in 10 ml. of water and 30 ml. of 95% ethanol is added to 8.8 g. of ethyl 2-(2,5-dichlorophenyl)cyclopropanecarboxylate. The solution is refluxed for eight hours, then concentrated, acidified with hydrochloric acid and filtered to give after fractional recrystallization the separated isomeric cis- and trans-2-(2,5-dichlorophenyl)cyclopropanecarboxylic acids.

To a solution of 6.0 g. of trans-2-(2,5-dichlorophenyl)cyclopropanecarboxylic acid in 30 ml. of water and 50 ml. of acetone cooled to 0° C. is added 3.3 g. of triethylamine in 35 ml. of acetone. A solution of 3.5 g. of ethyl chloroformate in 50 ml. of acetone is slowly added and the solution then stirred for 30 minutes at 0° C. A solution of 3.5 g. of sodium azide in 35 ml. of water is added dropwise and the stirring continued for one hour. The reaction mixture is poured into ice water and extracted with ether. The extract is evaporated to give the azide. A toluene solution of the azide is heated on a steam bath until the evolution of nitrogen ceases and is then evaporated in vacuo to leave trans-2-(2,5-dichlorophenyl)cyclopropylisocyanate.

The isocyanate is refluxed with hydrochloric acid for 18 hours to give on cooling, concentrating and neutralizing trans-2-(2,5-dichlorophenyl)cyclopropylamine.

Twenty grams of 2-(2,5-dichlorophenyl)cyclopropylamine is refluxed in ethyl formate for eight hours. Evaporation and recrystallization of the residue from ether gives N-formyl-2-(2,5-dichlorophenyl)cyclopropylamine. Eleven grams of this N-formyl compound and 1.2 g. of sodium hydride are refluxed in benzene for one hour to give the sodio derivative of N-formyl-2-(2,5-dichlorophenyl)cyclopropylamine which is treated with 6.7 g. of sulfuryl chloride in benzene at 0–5° C. with stirring. The resulting mixture is treated with gaseous ammonia and allowed to stand for about 16 hours. The mixture is filtered and the filtrate is washed with water and evaporated to dryness in vacuo. The residue is heated with 3% dilute aqueous hydrochloric acid for one hour and, after working up as in Example 1, 2-(2,5-dichlorophenyl)cyclopropylsulfamide is obtained.

Similarly, using 2-(3,4-dichlorophenyl)cyclopropylamine (prepared from 3,4-dichlorostyrene by the above described procedure) as the starting material the product is 2-(3,4-dichlorophenyl)cyclopropylsulfamide.

*Example 12*

4-fluorostyrene (21.0 g.) and 35.0 g. of ethyl diazoacetate are mixed at 0° C. and gradually taken to 160° C. and held at that temperature for four hours. The mixture is distilled under reduced pressure to give two fractions, cis-ethyl 2-(4-fluorophenyl)cyclopropanecarboxylate, and trans-ethyl 2-(4-fluorophenyl)cyclopropanecarboxylate.

To trans-ethyl 2-(4-fluorophenyl)cyclopropanecarboxylate is added a solution of potassium hydroxide in water and 95% ethanol. The resulting solution is refluxed for four hours and then concentrated in vacuo. The residue is dissolved in 40 ml. of water and the solution adjusted to pH 1 with 10% hydrochloric acid solution. The precipitate is recrystallized from boiling water to give trans-2-(4-fluorophenyl)cyclopropanecarboxylic acid.

A mixture of 10.0 g. of trans-2-(4-fluorophenyl)cyclopropanecarboxylic acid and 20 ml. of thionyl chloride is allowed to stand at room temperature for 20 hours. Excess thionyl chloride is removed in vacuo and the residue is distilled under reduced pressure to give, trans-2-(4-fluorophenyl)cyclopropanecarbonyl chloride.

Technical sodium azide in dry toluene is heated gradually while a solution of 10.0 g. of trans-2-(4-fluorophenyl)cyclopropanecarbonyl chloride in 50 ml. of dry toluene is added slowly over a period of 15 minutes. The mixture is refluxed for three hours, cooled, and the precipitated salts are filtered. The filtrate is evaporated in vacuo to leave the isocyanate which is treated with 100 ml. of concentrated hydrochloric acid. The mixture is stirred and refluxed for 20 hours. The resulting solution is concentrated in vacuo to give trans-2-(4-fluorophenyl)cyclopropylamine hydrochloride.

The free base is liberated from the above hydrochloride salt by neutralizing an aqueous solution of the salt with dilute alkali, extracting with benzene and evaporating the benzene extract to give the residual trans-2-(4-fluorophenyl)cyclopropylamine.

Refluxing 2-(4-fluorophenyl)cyclopropylamine with ethyl formate and treating the resulting N-formyl derivative with sodium hydride gives the corresponding sodio derivative which is treated with sulfuryl chloride followed by an excess of diethylamine. The mixture is allowed to stand overnight. After working up as in Example 1 and heating with dilute aqueous hydrochloric acid for one hour, the product is N',N'-dimethyl-N-[2-(4-fluorophenyl)cyclopropyl]sulfamide.

Similarly, using as the starting materials the following substituted phenylcyclopropylamines (prepared from the corresponding substituted styrenes by the procedure of Example 4):

2-(3-tolyl)cyclopropylamine,
2-(2,4-xylyl)cyclopropylamine,
2-(4-butylphenyl)cyclopropylamine,
2-(4-aminophenyl)cyclopropylamine and
2-(4-methoxyphenyl)cyclopropylamine and using gaseous ammonia in place of diethylamine in the above procedure the following products are obtained:

2-(3-tolyl)cyclopropylsulfamide,
2-(2,4-xylyl)cyclopropylsulfamide,
2-(4-butylphenyl)cyclopropylsulfamide,
2-(4-aminophenyl)cyclopropylsulfamide and
2-(4-methoxyphenyl)cyclopropylsulfamide, respectively.

Example 13

Five grams of 2-(4-methoxyphenyl)cyclopropylsulfamide, prepared as in Example 12, is heated with 25 ml. of 37% hydrochloric acid for five hours at 100° C. The excess acid is evaporated in vacuo and the residue is recrystallized from benzene to give 2-(4-hydroxyphenyl)cyclopropylsulfamide.

Example 14

A solution of 70 g. of dl-trans-2-phenylcyclopropylamine in 50 ml. of ethanol and 50 ml. of ether is added to a solution of 79 g. of d-tartaric acid in 400 ml. of ethanol. The mixture is cooled to 0° C. and filtered. The product is recrystallized five times from isopropanol to give the d-tartrate salt of l-trans-2-phenylcyclopropylamine, M.P. 188–190° C.; $[\alpha]_D^{25}=-30.5$ (1% in water). This tartrate salt is suspended in water and treated with excess 40% sodium hydroxide solution. Extraction with ether and removal of the solvent from the extracts gives l-trans-2-phenylcyclopropylamine.

The isopropanolic mother liquors from the five recrystallizations described above are concentrated. The residue is dissolved in warm water, cooled and made strongly alkaline with 40% sodium hydroxide. The mixture is extracted with ether and the extracts are concentrated and distilled to give an oil, B.P. 50° C. (0.4 mm.). Treatment of this product with l-tartaric acid in ethanol and recrystallization of the resulting l-tartrate salt from ethanol gives the l-tartrate salt of d-trans-2-phenylcyclopropylamine, M.P. 189–191° C.; $[\alpha]_D^{25}=+31.0$ (1% in water). The tartrate salt is dissolved in warm water and treated with excess sodium hydroxide solution. Extraction with ether and concentration of the extracts gives d-trans-2-phenylcyclopropylamine.

By the procedure of Example 1 d-trans-2-phenylcyclopropylamine is converted to its N-formyl derivative which is treated with sodium hydride to give the sodio derivative. Treatment with sulfuryl chloride and ammonia, followed by hydrolysis with dilute hydrochloric acid gives d-trans-2-phenylcyclopropylsulfamide.

Substituting l-trans-2-phenylcyclopropylamine for the d isomer in the above reaction gives l-trans-2-phenylcyclopropylsulfamide.

dl-Cis-2-phenylcyclopropylamine is similarly separated by recrystallization of its tartrate salts into d-cis-2-phenylcyclopropylamine and l - cis - 2 - phenylcyclopropylamine which by the procedure of Example 1 are converted into d-cis-2-phenylcyclopropylsulfamide and l-cis-2-phenylcyclopropylsulfamide, respectively.

Example 15

A mixture of 7.3 g. of N-methyl-2-phenylcyclopropylamine and 6.7 g. of sulfuryl chloride in 100 ml. of benzene is stirred at about 0° C. for 30 minutes. The mixture is treated with an excess of gaseous ammonia and allowed to stand overnight. After filtering, washing the filtrate with water, evaporating to dryness in vacuo and recrystallizing the residue from benzene, N-methyl-N-(2-phenylcyclopropyl)sulfamide is obtained.

Substituting dimethylamine for ammonia in the above reaction gives N,N′,N′ - trimethyl-N-(2 - phenylcyclopropyl)sulfamide.

By the procedure described above, 4.7 g. of N-butyl-2-phenylcyclopropylamine (prepared by reacting equimolar amounts of n-butyl bromide and 2-phenylcyclopropylamine in ethanol in the presence of potassium carbonate) is reacted with 3.4 g. of sulfuryl chloride in benzene at 0–5° C. and the resulting mixture is treated with gaseous ammonia to give N-butyl-N-(2-phenylcyclopropyl)sulfamide.

Example 16

To a solution of 34 g. of phenyldiazomethane in 1.5 l. of dry ether and 4 g. of hydroquinone is added 212 g. of freshly distilled methyl methacrylate at 0–5° C. The mixture is allowed to stand for ten hours. The ether and the excess methyl methacrylate are distilled in vacuo and the residue is heated for 1.5 hours at 120–135° C. in vacuo and then distilled to give a fraction distilling at 88–91° C. at 3.0 mm. which is methyl 1-methyl-2-phenylcyclopropanecarboxylate.

By the procedure of Example 11 the above prepared carboxylate is saponified to give the carboxylic acid which is converted through the mixed anhydride, azide and isocyanate to 1-methyl-2-phenylcyclopropylamine.

Ten grams of 1-methyl-2-phenylcyclopropylamine is heated at reflux in ethyl formate for nine hours and the resulting N-formyl derivative is treated with sodium hydride in benzene at reflux for one hour to give the sodio derivative of N - formyl-1-methyl-2-phenylcyclopropylamine. Stirring this intermediate with sulfuryl chloride in benzene at 0–5° C. and treating with an excess of gaseous ammonia gives 1-methyl-2-phenylcyclopropylsulfamide.

What is claimed is:

1. A compound of the formula:

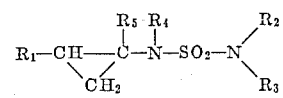

in which:
   $R_1$ is a member selected from the group consisting of phenyl, halophenyl, trifluoromethylphenyl, lower alkylphenyl, lower alkoxyphenyl, aminophenyl, hydroxyphenyl, dihalophenyl, di-lower alkylphenyl, di-lower alkoxyphenyl and methylenedioxyphenyl;
   $R_2$ and $R_3$ are members selected from the group consisting of hydrogen and, when taken together, mono-lower alkylamino, di-lower alkylamino, N-pyrrolidinyl, N-piperidyl, N-piperazinyl, N′-lower alkyl-N-piperazinyl and N′-hydroxy - lower alkylenepiperazinyl;
   $R_4$ is a member selected from the group consisting of hydrogen and lower alkyl and
   $R_5$ is a member selected from the group consisting of hydrogen and lower alkyl.

2. A compuond of the formula:

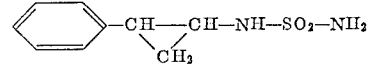

3. A compound of the formula:

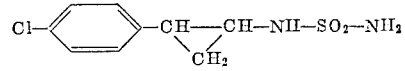

4. A compound of the formula:

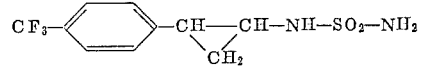

5. Trans-2-phenylcyclopropylsulfamide.

References Cited in the file of this patent

UNITED STATES PATENTS

| | | |
|---|---|---|
| 2,173,054 | Hitch | Sept. 12, 1939 |
| 2,173,056 | Hitch et al. | Sept. 12, 1939 |
| 2,553,770 | Kittleson | May 22, 1951 |
| 2,829,038 | Oshsner | Apr. 1, 1958 |
| 2,867,658 | Frick | Jan. 6, 1959 |
| 3,041,336 | Teufel | June 26, 1962 |
| 3,068,283 | Kaiser et al. | Dec. 11, 1962 |

FOREIGN PATENTS

| | | |
|---|---|---|
| 947,554 | Germany | Aug. 16, 1956 |
| 789,273 | Great Britain | Jan. 15, 1958 |

OTHER REFERENCES

Burger: Medicinal Chemistry, 2nd edition, page 81, Interscience Publishers, Inc., New York (1960).

Vandi et al.: Journal Organic Chemistry, vol. 26, No. 4, pp. 1136–1138 (1961).